(12) United States Patent
Goldberg

(10) Patent No.: US 8,136,801 B2
(45) Date of Patent: Mar. 20, 2012

(54) ADJUSTABLE TENSION SPRING ANCHOR WITH ROTATABLE HEAD

(75) Inventor: Matt Goldberg, Indianapolis, IN (US)

(73) Assignee: Accurate Manufactured Products Group, Inc., Indianapolis, IN (US)

( * ) Notice: Subject to any disclaimer, the term of this patent is extended or adjusted under 35 U.S.C. 154(b) by 748 days.

(21) Appl. No.: 12/207,935

(22) Filed: Sep. 10, 2008

(65) Prior Publication Data

US 2010/0059913 A1     Mar. 11, 2010

(51) Int. Cl.
    *F16F 1/06* (2006.01)
(52) U.S. Cl. .......................... 267/177; 267/179
(58) Field of Classification Search ............ 267/175, 267/177, 179, 154
    See application file for complete search history.

(56) References Cited

U.S. PATENT DOCUMENTS

| | | | |
|---|---|---|---|
| 1,079,925 A | 11/1913 | Prather | |
| 1,189,963 A | 7/1916 | Jones | |
| 1,271,535 A * | 7/1918 | Bijur | 335/97 |
| 2,265,629 A | 12/1941 | Christiansen | |
| 2,867,287 A | 1/1959 | Armstrong | |
| 4,032,129 A | 6/1977 | Larsson | |
| 4,544,817 A * | 10/1985 | Basnett | 200/293 |
| 5,232,207 A | 8/1993 | Champ et al. | |
| 514,761 A | 2/1994 | Maggs | |
| 5,332,071 A | 7/1994 | Duncan | |
| 5,540,417 A | 7/1996 | Spencer | |
| 6,345,583 B1 | 2/2002 | Thackston et al. | |
| 6,485,004 B1 | 11/2002 | Licata et al. | |

* cited by examiner

*Primary Examiner* — Melanie Torres Williams

(74) *Attorney, Agent, or Firm* — Woodard Emhardt Moriarty McNett & Henry LLP

(57) ABSTRACT

An adjustable tension spring anchor with rotatable head. A flanged head is rotatably mounted to a threaded cylinder mounted to a first element. The rotatable head is connectable to one end of a tension spring having its opposite end attached to a second element. A pair of mutually opposed flat surfaces on the cylinder and a socket at the end of the cylinder allows the cylinder to be rotated to adjust tension without twisting of the attached spring.

15 Claims, 2 Drawing Sheets

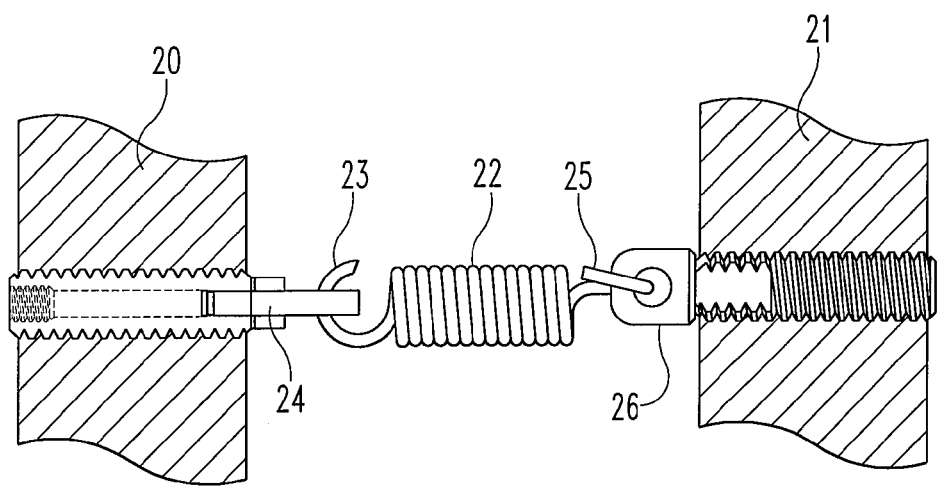
*Fig. 1*
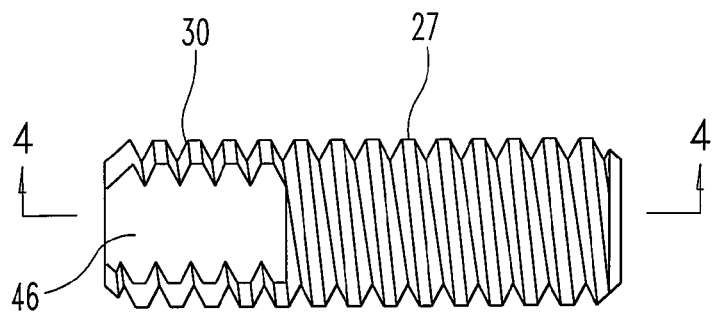 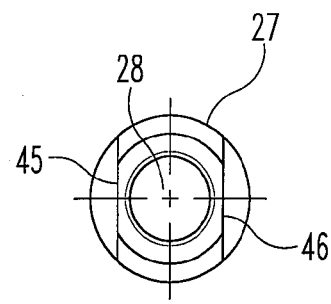
*Fig. 2* *Fig. 3*

ADJUSTABLE TENSION SPRING ANCHOR WITH ROTATABLE HEAD

BACKGROUND OF THE INVENTION

1. Field of the Invention

The present invention relates generally to the field of anchors for securing tension springs.

2. Description of the Prior Art

Tension springs are used in a variety of products including machinery. Typically, one end of the helical spring is attached to a particular machine member that is movable whereas the opposite end of the spring is attached to a stationary object.

U.S. Pat. No. 4,032,129 issued to Larsson, there is disclosed a device for adjusting the tension of a spring. A threaded cylinder is attached to one end of the spring with the threaded cylinder being rotatably mounted to an object. The opposite end of the spring is attached to a member. The threaded cylinder has a longitudinal axis in line with the spring axis and thus, rotation of the threaded cylinder results in stretching or compressing the tension spring thereby controlling the spring tension.

A problem occurs in utilizing the prior tension spring anchors in that as the tension on the extension spring is adjusted, the spring twists as the anchor is rotated. In extreme cases, the spring will twist and deviate from its normal longitudinal axis. I have designed a swivel spring anchor that allows the spring tension to be adjusted without the spring twisting. A rotatable head is mounted to a threaded cylinder with the head, in turn, connection to one end of the tension spring. As a result, rotation of the threaded cylinder will increase or decrease the tension in the spring without twisting the spring. Disclosed herein is my new adjustable tension spring anchor with a rotatable head.

SUMMARY OF THE INVENTION

One embodiment of the present invention is a swivel anchor for adjusting the tension on a spring including a head connectable to the spring. An elongated cylindrical main body has a longitudinal axis and a first end and a second end. The first end has the head movably mounted thereon to allow the head and attachable spring to remain rotatably stationary while the main body is rotated about the axis to change the tension in the spring or to allow the main body to remain stationary while the head and attachable spring are rotated about the axis to change the tension in the spring.

It is an object of the present invention to provide a new and improved tension spring anchor.

A further object of the present invention is to provide a spring anchor that allows for adjustment in the tension of a connected spring without twisting of the spring.

Related objects and advantageous of the present invention will be apparent from the following description.

BRIEF DESCRIPTION OF THE DRAWINGS

FIG. 1 is cross-sectional view with a tension spring having one end mounted to a first member with the second end mounted to a tension spring anchor with rotatable head, in turn, mounted to a second member.

FIG. 2 is an enlarged side view of the externally threaded main body of the anchor of FIG. 1.

FIG. 3 is a left end view of the main body of FIG. 2.

DESCRIPTION OF THE PREFERRED EMBODIMENT

Figure 4:
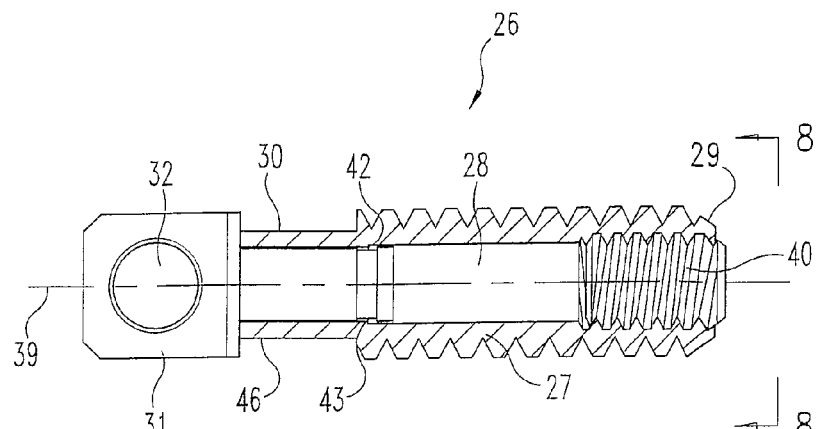
FIG. 4 is a cross-sectional view taken along the line and viewed in the direction of arrows 4-4 of FIG. 2 with the head of FIG. 5 mounted thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 5:
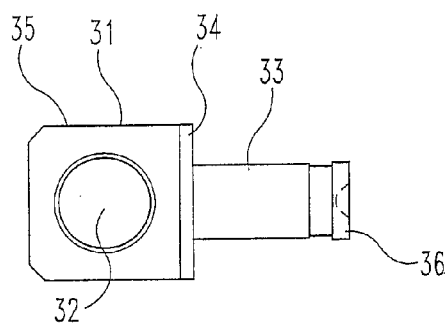
FIG. 5 is a side view of the head.
Figure 6:
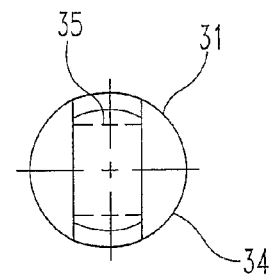
FIG. 6 is a left end view of the head of FIG. 5.

Referring now more particularly to FIG. 1, there is shown a pair of members 20 and 21 that are represented as walls. Extending between walls 20 is a conventional tension helical spring 22 having a first end 23 affixed by anchor 24 to element 20 and a second spring end 25 attached to the anchor 26 incorporating the present invention. Anchor 26 has an externally threaded cylindrical main body 27 (FIG. 4) with a central passage 28 extending therethrough from end 29 to end 30. A head 31 is rotatably mounted to end 30 and has a hole 32 for receiving end 25 of spring 22. Head 31 has a cylindrical portion 33 (FIG. 5) integrally attached to a disc shaped flange 34, in turn, integrally attached to a flange 35 extending outwardly therefrom. Hole 32 extends through flange 35.

Figure 7:
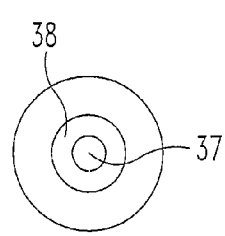
FIG. 7 is a right end view of the head of FIG. 5.

Cylindrical head portion 33 has a diameter smaller than the diameter of the disc shaped flange 34 and also slightly smaller than the inside diameter of passage 28 of the threaded main body 27. End 36 of cylindrical portion 33 has a recess 37 (FIG. 7) formed therein thereby creating a rim 38 surrounding the recess. Rim 38 may be plastically deformed once cylindrical portion 33 is inserted into the cylindrical main body 27 by extending a punch tool into passage 28 against end 36 thereby rolling over the rim atop the rim.

Figure 8:
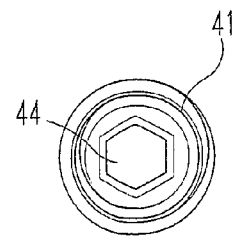
FIG. 8 is an end view looking in the direction of arrows 8-8 of FIG. 4.

Main body 27 has a longitudinal axis 39 (FIG. 4) extending centrally through passage 28. The end 29 of passage 28 located opposite of the end receiving the rotatable head 31 has internal threads 40 to receive a standard set screw 41 (FIG. 8) having a hexagonally shaped socket 44 opening outwardly from the main body. The opposite end 30 of passage 28 has a reduced diameter as compared to the remaining portion of passage 28 thereby forming a ledge 42 having a continuous stop surface 43 facing end 29 of the cylindrical main body. Prior to mounting set screw 41 to main body 27, and after the cylindrical portion 33 of head 31 is inserted into the main body, a punch tool may be inserted into passage 28 having a tip extendable into recess 37 with the tool then plastically deforming rim 38 so that at least a portion of the rim is positioned adjacent surface 43 of ledge 42 and preventing disengagement of head 31 from main body 27. The rim is plastically deformed in such a manner that cylindrical portion 33 is allowed to rotate about axis 39 relative to the main body thereby allowing head 31 to freely rotate independent of main body 27.

Disc shaped flange 34 is positioned adjacent end 30 of main body 27 and provides a bearing surface upon which the head may contact the threaded main body and rotate. Once the head is mounted to the cylindrical main body, set screw 41 is inserted into end 29 of the passage. A suitable liquid adhesive may be placed on the external threads of the set screw to prevent relative motion between the set screw and the cylindrical main body once the adhesive solidifies.

A pair of outwardly facing and mutually opposed flat surfaces 45 and 46 (FIG. 3) are provided at end 30 of the cylindrical main body to enable a wrench or other tool to engage the surfaces and rotate the cylindrical main body about the longitudinal axis 39. Alternatively, a socket wrench may be inserted into socket 44 of set screw 41 (FIG. 8) and rotate the cylindrical main body about the longitudinal axis 39. In such a manner, anchor 26 is advanced along longitudinal axis 39 thereby increasing or decreasing the tension within spring 22. Since head 26 is rotatably mounted to the threaded main body 27, rotation of main body 27 about axis 39 allows head 26 to not rotate as it advances along axis 39 thereby eliminating any possible twisting of spring 22 as end 25 is pulled in a direction away from spring end 23 or alternatively end 25 moving toward end 23 to respectively increase or decrease the tension in the spring and thus the force between members 20 and 21. Anchor 24 is fixedly mounted to element 20 and will not move unless element 20 moves. If element 20 moves or rotates then anchor 24 will move or rotate as a unit with element 20.

The spring anchor disclosed herein allows for the adjustment of tension on the spring without twisting the spring. The attachment point to the spring is on a swivel or a rotatable head allowing the spring to be drawn tighter without changing or twisting the spring position. There are two ways to adjust the anchor either with a hex key from the bottom of the anchor engaging the socket of a set screw mounted to the threaded main body or by using the wrench flats on the opposite end of the anchor.

The spring anchor may be produced from a variety of materials such as steel, soft, black oxide and 18-8 stainless steel. Typical thread sizes used on the anchor range from 6-32 to ⅜-16.

The rotatable head 26 is particularly advantageous in that the head remains rotatably stationary even though it is advanced along the longitudinal axis 39 as the threaded main body 27 is rotated. A secondary advantage of the anchor spring disclosed herein is that with threaded cylinder 27 remaining stationary relative to element 21, element 20 may be rotated about axis 39 hereby either increasing or decreasing the length of tension spring 20 and respectively increasing or decreasing the tension exerted between elements 20 and 21. Rotation of element 20 does not result in twisting of spring 22 since head 26 will rotate with the spring as element 20 is rotated while cylinder 27 remains stationary. The spring longitudinal axis is alignable and the same as the longitudinal axis of anchor 26, While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A swivel anchor for adjusting the tension on a spring comprising:
   a head connectable to a spring; and,
   an elongated cylindrical main body with a longitudinally axis and having a first end and a second end, said first end having said head movably mounted thereon to allow said head and attachable spring to remain rotatably stationary while said main body is rotated about said axis to change the tension in the spring or to allow said main body to remain stationary while said head and attachable spring are rotated about said axis to change the tension in the spring, said head includes a portion attached to said main body limiting relative longitudinal movement between said head and said main body along said axis during relative rotational movement therebetween.

2. A swivel anchor for adjusting the tension on a spring comprising:
   a head connectable to a spring; and,
   an elongated cylindrical main body with a longitudinally axis and having a first end and a second end, said first end having said head movably mounted thereon to allow said head and attachable spring to remain rotatably stationary while said main body is rotated about said axis to change the tension in the spring or to allow said main body to remain stationary while said head and attachable spring are rotated about said axis to change the tension in the spring; and wherein:
   said main body includes means for engaging to rotate said main body about said axis,
   said means includes at said second end a tool engageable socket to allow said main body to be engaged to rotate said main body about said axis, and
   said main body has external threads thereon for mounting of said main body and further comprising a socket screw mounted to said main body and extending therein with said screw having an outwardly opening socket to be engaged to rotate said main body about said axis.

3. A swivel anchor for adjusting the tension on a spring comprising:
   a head connectable to a spring; and,
   an elongated cylindrical main body with a longitudinally axis and having a first end and a second end, said first end having said head movably mounted thereon to allow said head and attachable spring to remain rotatably stationary while said main body is rotated about said axis to change the tension in the spring or to allow said main body to remain stationary while said head and attachable spring are rotated about said axis to change the tension in the spring; and
   wherein said main body has a hollow passage extending therethrough from said first end to second end, said passage at said first end is reduced in diameter forming an internal ledge facing said second end, said head has a cylindrical end with a recess formed thereon defining a deformable rim, said cylindrical end extending into said first end with said first end positioned between said ledge and said second end and being plastically deformed to hold said head to said main body but allowing said main head to rotate about said axis.

4. A swivel anchor for adjusting the tension on a spring comprising:
   a head connectable to a spring; and,
   an elongated cylindrical main body with a longitudinally axis and having a first end and a second end, said first end having said head movably mounted thereon to allow said head and attachable spring to remain rotatably stationary while said main body is rotated about said axis to change the tension in the spring or to allow said main body to remain stationary while said head and attachable spring are rotated about said axis to change the tension in the spring; and
   wherein said hollow passage is internally threaded at said second end and further comprising a socket screw extending into said second end of said main body having external threads in meshing engagement with said internal threads.

5. The anchor of claim 4 wherein said head includes a flange integral with said cylindrical end with said flange having a hole to receive an end of said spring, said head further includes a disc shaped portion positioned between said flange and said first end providing a bearing surface to allow said head to movably ride on said first end.

6. A spring anchor for changing the tension in a spring while not twisting the spring comprising:
an elongated cylindrical main body with a first end and opposite second end and a longitudinal axis extending therebetween, said main body includes a first threaded surface and further includes a hollow interior extending in a direction of said axis; and,
a mounting head rotatably mounted to said first end of said main body and having first engageable means to receive and hold one end of a spring, said head including a portion extending along said axis into said hollow interior and engaged with said main body which is rotatable about said axis on said threaded surface to move said head longitudinally along said axis and change the tension in the spring while limiting relative rotation between said portion and spring.

7. The anchor of claim 6 wherein said cylindrical main body includes second engageable means for external engagement to rotate said main body on said axis to move said head and said spring longitudinally along said axis and change the tension in the spring.

8. The anchor of claim 7 wherein said first engageable means includes a hole on said mounting head to receive and hold an end of said spring and said second engageable means includes a surface to move around said axis.

9. The anchor of claim 8 wherein said second engageable means includes a pair of outwardly facing and opposed flat wrench surface on said main body for gripping and rotating said main body about said axis.

10. A spring anchor for changing the tension in a spring while not twisting the spring comprising:
an elongated cylindrical main body with a first end and opposite second end and a longitudinal axis extending therebetween, said main body includes a first threaded surface; and,
a mounting head rotatably mounted to said first end of said main body and having first engageable means to receive and hold one end of a spring, said head including a portion extending into and engaged with said main body which is rotatable about said axis on said threaded surface to move said head longitudinally along said axis and change the tension in the spring while limiting relative rotation between said portion and spring; and
wherein said main body has a hollow passage extending therethrough from said first end to second end, said head has a cylindrical end extending into said first end rotatably mounting said head to said main body and allowing said head to rotate about said axis, said main body has a ledge formed within said hollow passage, said cylindrical end is deformed against said ledge limiting relative longitudinal movement on said axis between said head and said main body while allowing relative rotational movement therebetween.

11. The combination extendable between a first support and a second support spaced apart from the first support of:
a helical spring with a spring first end and a spring second end with a spring axis extending therebetween, said first end mountable to a first support with said spring extendable toward a second support; and,
a main body having a main body first end and a main body second end with a main body axis extending therebetween, said main body first end mountable to the second support with said main body axis being alignable with said spring axis, said main body further having a head rotatably mounted to said main body first end and attachable to said spring second end, said main body or said spring being rotatable about said main body axis and said spring axis to change tension in said spring, said head extends into and is engaged with said main body to limit relative movement therebetween along said main body axis while allowing relative rotational movement therebetween.

12. The combination of claim 11 wherein said main body includes a wrench engageable flat surface thereon to allow said main body to be engaged by a wrench to rotate said main body about said main body axis.

13. The anchor of claim 11 wherein said main body includes at said main body second end a tool engageable socket to allow said main body to be engaged to rotate said main body.

14. The anchor of claim 11 wherein main body said head includes a flange with a hole to receive said spring second end.

15. An adjustable tension spring anchor for changing tension in a spring while not twisting the spring which is mountable to and extendable between a first member and a second member comprising:
an elongated cylindrical main body having an outer cylindrical surface with threads formed thereon, said main body having a first end and a second end with a longitudinal axis extending there between, said main body having a hollow interior extending along said longitudinal axis, said main body threadly mountable by said threads to a first member; and,
a mounting head having a shank extending along said axis into said hollow interior rotatably mounting said head to said main body, said head having a portion to hold an end of a spring extendable between said first member and a second member, said main body rotatable on said threads around said axis and movable longitudinally along said axis while said head moves longitudinally along the axis with the main body to change tension in the spring while limiting relative rotation between said head and said main body to limit twisting of the spring.

* * * * *

UNITED STATES PATENT AND TRADEMARK OFFICE
CERTIFICATE OF CORRECTION

PATENT NO. : 8,136,801 B2  Page 1 of 1
APPLICATION NO. : 12/207935
DATED : March 20, 2012
INVENTOR(S) : Matt Goldberg It is certified that error appears in the above-identified patent and that said Letters Patent is hereby corrected as shown below:

Column 6, Claim 14, line 30, delete the phrase "main body".

Signed and Sealed this
Twenty-sixth Day of June, 2012

David J. Kappos
*Director of the United States Patent and Trademark Office*